United States Patent
Grubbs et al.

(10) Patent No.: US 12,328,458 B2
(45) Date of Patent: Jun. 10, 2025

(54) DYNAMIC AD INSERTION (DAI) VERIFICATION ENGINE AND METHOD FOR DYNAMIC AD INSERTION VERIFICATION

(71) Applicant: Vela Research LP, Clearwater, FL (US)

(72) Inventors: Kevin J. Grubbs, Palmetto, FL (US); Murali K. Reddy, Clearwater, FL (US)

(73) Assignee: Vela Research LP, Clearwater, FL (US)

( * ) Notice: Subject to any disclaimer, the term of this patent is extended or adjusted under 35 U.S.C. 154(b) by 0 days.

(21) Appl. No.: 18/480,662

(22) Filed: Oct. 4, 2023

(65) Prior Publication Data

US 2024/0114182 A1   Apr. 4, 2024

Related U.S. Application Data

(60) Provisional application No. 63/413,091, filed on Oct. 4, 2022.

(51) Int. Cl.
*H04N 21/234* (2011.01)
*G06F 16/783* (2019.01)
*H04N 21/24* (2011.01)
*H04N 21/262* (2011.01)

(52) U.S. Cl.
CPC ..... *H04N 21/23424* (2013.01); *G06F 16/783* (2019.01); *H04N 21/2404* (2013.01); *H04N 21/26241* (2013.01)

(58) Field of Classification Search
CPC .................................................. H04N 21/23424
See application file for complete search history.

(56) References Cited

U.S. PATENT DOCUMENTS

2019/0266632 A1*   8/2019   Milford ............. G06Q 30/0241

\* cited by examiner

*Primary Examiner* — Michael H Hong
(74) *Attorney, Agent, or Firm* — Maier & Maier, PLLC

(57) ABSTRACT

An embodiment may verify advertisements dynamically inserted correctly in a data stream or media feed. A capture server may emulate one or more target profiles. The advertisements may be inserted from an ad server based on the target profile retrieved from a data match vendor. The inserted advertisement may then be recorded and captured by the capture server, and a fingerprint of the inserted advertisement may be extracted. The extracted fingerprint may be compared to fingerprints in a database of known advertisements to confirm/verify that the correct advertisement was successfully shown.

20 Claims, 6 Drawing Sheets

Figure 3: Capture Process

DYNAMIC AD INSERTION (DAI) VERIFICATION ENGINE AND METHOD FOR DYNAMIC AD INSERTION VERIFICATION

BACKGROUND

Modern day video, audio and multimedia programs often include advertisements interspersed throughout, in the form of commercials. Linear, live, streaming and on-demand platforms can integrate advertising at certain points throughout their programming. Advertisers may pay for timeslots on specific programs or may select a target audience to reach. For example, advertisements may be presented based on metadata associated with a user or based on other targeting criteria or metrics. The targeting criteria and metrics for an advertisement together are sometimes referenced as the target profile.

Advertisers and media transmitting and delivery platforms have an interest in verifying whether an advertisement was correctly shown. For example, it may be beneficial to advertisers to verify that the correct specific advertisement was presented to the correct demographic and/or number of users and was of the correct length and quality. Therefore, it would be desirable that transmitting and delivery platforms may verify that the correct advertisements were presented to the viewers, and that they were properly presented in order to identify potential errors in their system. However current computer systems are not able to efficiently monitor, verify, and correct these advertisements.

SUMMARY

According to at least one exemplary embodiment, a method, system, computer program product, and apparatus for verifying content provided to one or more users may be shown and described. A method for ad insertion verification may include initializing a capture server by loading one or more emulators and capturing data feed from the one or more emulators. A captured content fingerprint may be formed for each of the one or more emulators based on the captured data feed and one or more advertisements may be served to each of the one or more emulators. The one or more advertisements served to the one or more emulators may be captured and a captured advertisement fingerprint may be created. It may be determined whether the advertisement fingerprint is the correct advertisement and was properly inserted.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
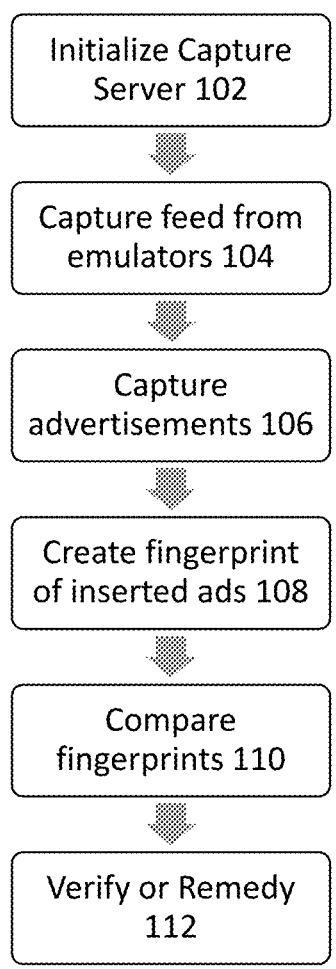
FIG. 1 is an exemplary embodiment of a process for inserting and verifying advertisements.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Referring to the figures generally. An exemplary embodiment may include one or more emulators configured to run on a capture server. The emulators may emulate a device that captures and processes a media feed such as a set top box or user device. Each emulator may be associated with one of multiple potential target profiles. An exemplary capture server may be loaded with multiple emulators running simultaneously. The emulators may receive a linear feed such as live media or may receive a video-on-demand feed. For example, an emulator may receive a live data stream, the live data stream including a live feed of a television channel, or a stream received from a video-on-demand service. It may be contemplated that the data feed or stream may include channels, shows, live or file-based sports, news, films, podcasts, or other video or audio content selected by or presented to one or more users. Each emulator may represent a combination of a media input and a target profile.

An exemplary embodiment may analyze the captured feed to identify fingerprints within the feed. Each individual advertisement may be notated and identified by a distinct fingerprint. The fingerprints may be compared to fingerprints in a stored database to verify the advertisement. A fingerprint may include a distinct pattern incorporating the audio and/or video contained in the advertisement as well as metadata such as a unique identifier specific to that advertisement. The unique identifier specific to each advertisement may be a number, watermark or other coded notation assigned to the advertisement by an audience ratings company, industry association or other third party. Fingerprints may also include unique audio transform waveform characteristics, logo, marker, or image recognition elements within the video, and metadata, such as captioning, subtitling, and speech to text all used for the purposes of uniquely identifying specific content. For example, an embodiment may identify an advertisement insertion point within the feed. A fingerprint may be identified associated with the advertisement shown at the advertisement insertion point. The fingerprint identified from the feed can be compared to stored fingerprints in a database in order to identify which advertisement was shown and to confirm that the selected advertisement was properly shown. For example, a matching fingerprint can confirm that the correct advertisement for a target profile was inserted and played at the proper bitrate and was of the proper quality and length. If the extracted fingerprint does not match one in the database or is not the correct advertisement for the target profile, or if it was not properly played, an exemplary embodiment may identify and present an error message which may include a reason for the mismatch or may take remedial action such as requesting a replay of the advertisement, or flag the instance to the accounting system for an accounting adjustment or other remedy.

Target profiles may be identified and/or validated for each media channel or feed. Each media channel may also be validated with regards to each target profile. An exemplary embodiment may store data regarding the identification and verification of advertisements into the capture server or a searchable database. For example, the capture server may identify the frequency or timing associated with an advertisement or set of advertisements. It may be contemplated that each identified and verified performance of an advertisement can be associated with additional metadata, such as the target profile or profiles the advertisement is presented to, associated media feeds or channels, a playback time and frequency, and any other contemplated metric.

An exemplary embodiment may capture video from a linear video feed (such as a television channel or any streamed media content) or from a video-on-demand stream. The video may be captured by multiple emulators which are virtually simulated on a capture server. The emulators may simulate a user/target profile and a media feed to present to that target profile. Each emulator may simulate a unique combination of a target profile and a media feed. Fingerprints may be extracted from the media feed on each of the emulators and compared to stored fingerprints. The stored fingerprints may identify, for example, a show, episode, film, or advertisement played on the feed. The fingerprints may be compared to verify that the correct advertisement was shown to the target profile or to the emulator. For example, a fingerprint may identify that the incorrect advertisement was presented to the specific emulator that represents a specific target profile, that the bitrate or quality of the shown advertisement was lower than that of the stored version, or that the beginning, end or an interim segment was corrupted, skipped or overwritten by other content. An exemplary embodiment can then remedy the situation by, for example, requesting remedial action from the Ad Decision System and replaying the advertisement or by alerting the advertiser.

Referring now to FIG. 1, FIG. 1 may be a schematic flowchart depicting an exemplary dynamic advertisement insertion process. An exemplary embodiment may initialize a capture server by loading multiple emulators or emulator instances 102. Each emulator instance may represent a single target profile and may be tuned to a live, linear or streaming media feed or to an on-demand feed. A data feed from the emulators may be captured and/or monitored by capturing audio and/or video 104. Fingerprints may be formed from the captured media content 106. The fingerprint may include a distinct pattern incorporating the audio and/or video contained in the advertisement as well as metadata such as a unique identifier specific to that advertisement. In some exemplary embodiments, the fingerprint may be formed from video, audio, or a combination of audio and video. It may be contemplated that audio-only fingerprints can be used to increase the efficiency and processing speed of the identification and/or verification processes by comparing smaller amounts of data as opposed to the use of video or other types of fingerprints.

An advertisement may be served to each profile based on one or more factors, for example the particular channel and/or selected profile. In an exemplary embodiment, a data match vendor may determine which advertisement to serve to each profile based on the particular channel and selected profile. An ad decision system may communicate the decision made by the data match vendor to the ad server, which then inserts the specified advertisement. Each emulator may be served a unique selected media input with unique advertisements in conformance with that emulator's pre-defined media input and target profile. After an advertisement is served 106, an exemplary embodiment may capture the advertisement and create a fingerprint 108. The fingerprint may then be compared against fingerprints stored in a database of known advertisements and reference fingerprints 110. The comparison 110 may be used to verify that the correct advertisement was properly inserted based on the target profile and was inserted with at the correct quality and bitrate. An exemplary embodiment may identify and verify every advertisement played on each emulator. If the comparison 110 indicates a mismatch between the inserted advertisement and the known fingerprint of the desired advertisement, the method may remedy the issue such as by debugging and/or troubleshooting the target profile and emulator or by replaying/re-inserting the desired advertisement.

Each emulator may be associated one or more single targeting profiles. The targeting profile may include an array of values associated with a user profile. For example, the below Table 1 illustrates an exemplary array of a targeting profile. The targeting profile may also include specification of a media input or channel.

TABLE 1

| Criterion | Value 0 | Value 1 | Value 2 | Value 3 | N |
|---|---|---|---|---|---|
| Location | Pinellas | Hillsborough | Manatee | Pasco | 4 |
| Household Income | <50k | 50-100k | 100-200k | >200k | 4 |
| HH Age | <25 | 25-40 | 40-60 | >60 | 4 |
| Children | Yes | No | | | 2 |

Each targeting profile may include metadata indicating metrics such as location, children, household income and age. For example, a first targeting profile may be identified as TP1 and may include the first or $0^{th}$ values, such that TP1={0,0,0,0}. This may refer to the "Value 0" metrics in the above table, so TP1 may refer to a dataset including {Pinellas, <50 k, <25, Yes}, or that is the group of people located in Pinellas, with a household income of <50K, a household age of <25, and with children. Another exemplary targeting profile may be defined as TP2={1,0,0,0}={Hillsborough, <50 k, <25, Yes}. Thus, each element in the vector defining a target profile may indicate a value to simulate from an array of possible values for each element.

An emulator may emulate a unique target profile by feeding the target profile a media input. For example, the media input may be a live feed (such as a broadcast radio or television or cable channel or streamed media) or an on-demand feed. The emulator may emulate a set-top box or other machine. Target profiles may be assigned to different channels. For example, multiple emulators may capture/process the same media input for multiple target profiles or may capture/process different media inputs for the same target profile. The target profile information may be retrieved from a data match vendor. The advertisement selected to be inserted may be selected by an ad decision system which determines which ad to insert depending on data from the data match vendor, including the target profile information. The ad decision system may then communicate the selection to an ad server which inserts the requested ad into the media stream and may communicate what ad was selected for insertion to the Accounting system for verification and billing purposes.

An exemplary Accounting server may receive and/or store the verification results. Results may be retrievable and organizable by different metrics. The accounting server may provide the advertiser with a Proof of Performance or may indicate a remedial action to be taken (for unverified or mismatched clips). An exemplary accounting server or system may maintain and distribute the target profile data used by the data match vendor. An accounting system may also autonomously bill advertisers for ads inserted based on target profiles.

Figure 2:
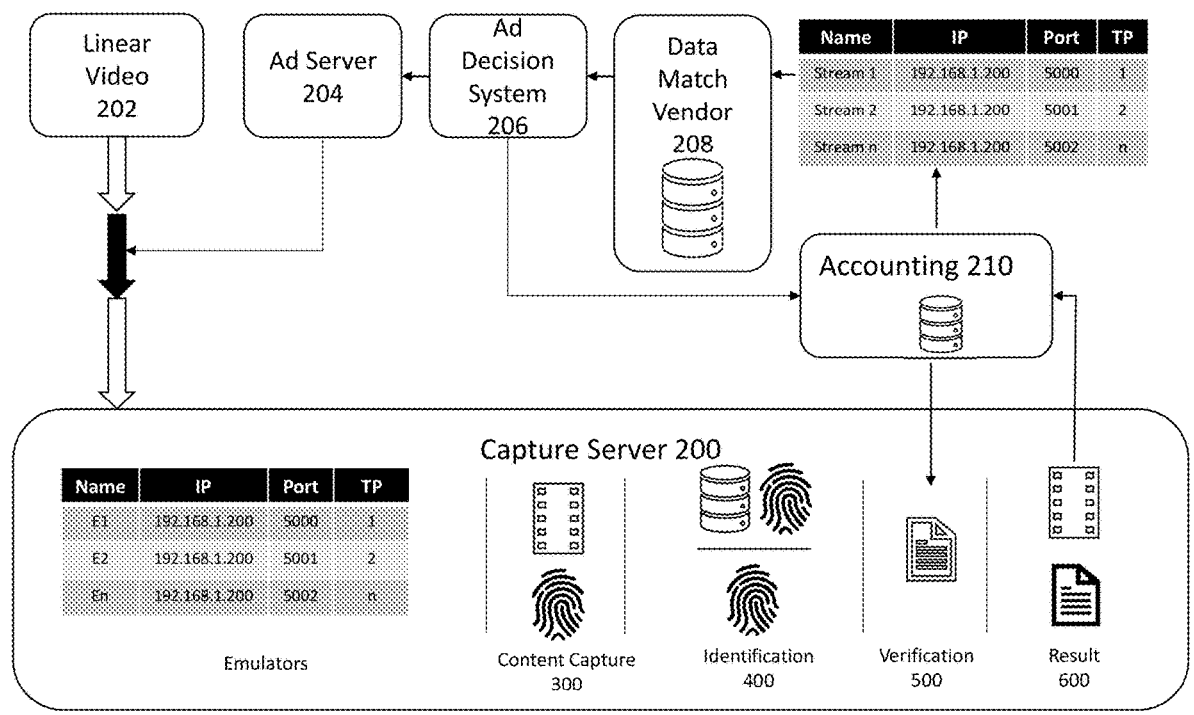
FIG. 2 is a schematic flowchart of the architecture of an exemplary embodiment.

Referring now to FIG. 2, FIG. 2 may illustrate an exemplary schematic flow chart of an advertisement insertion system. A data match vendor 208 may provide an ad decision system 206 with the profile information so that the ad decision system 206 may select an ad from the ad server 204. A capture server 200 may execute one or more emulators to capture a media feed such as linear video 202 and the inserted advertisements from an ad server 204. The capture server may capture content from the media streams 300, identify the content 400, verify that the content matches a stored fingerprint of the content 500, and produce a result 600 to the accounting server 210.

Figure 3:
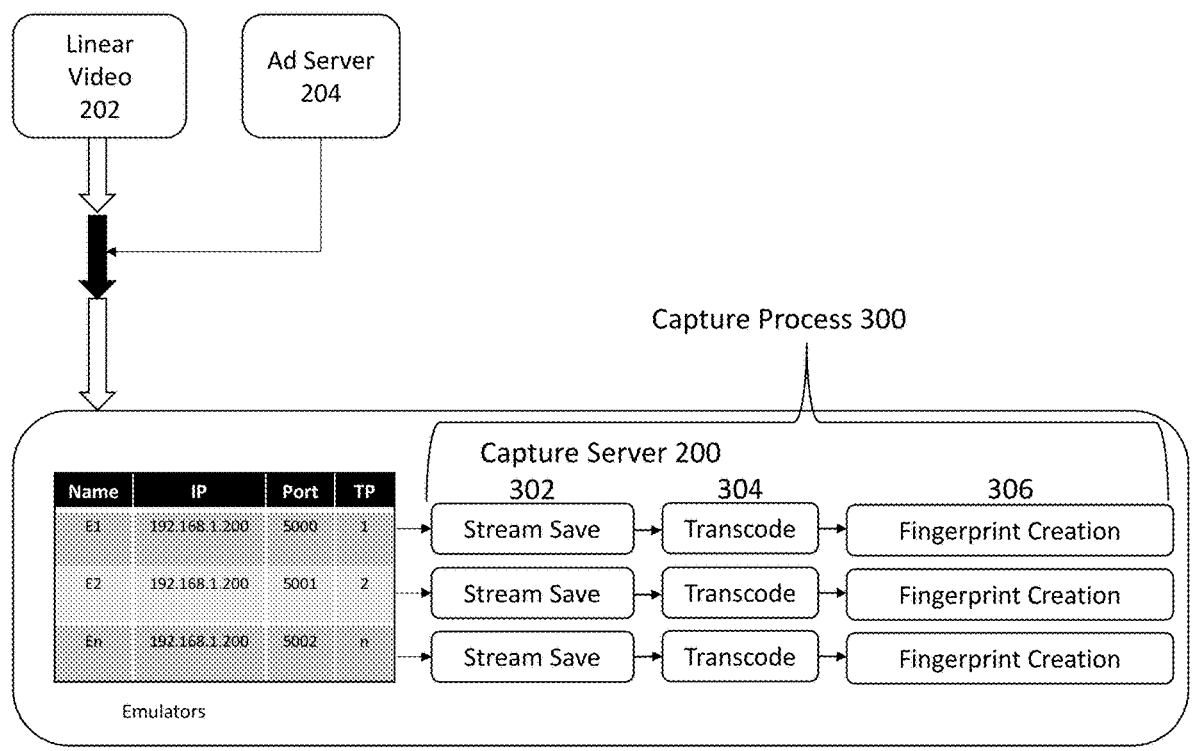
FIG. 3 is a schematic flowchart illustrating a capture process.

FIG. 3 may illustrate an exemplary capture process on a capture server 200. The server 200 may first save the stream associated with each IP 302. The saved stream may be transcoded 304 to normalize the data and file type before a fingerprint is created 306.

Figure 4:
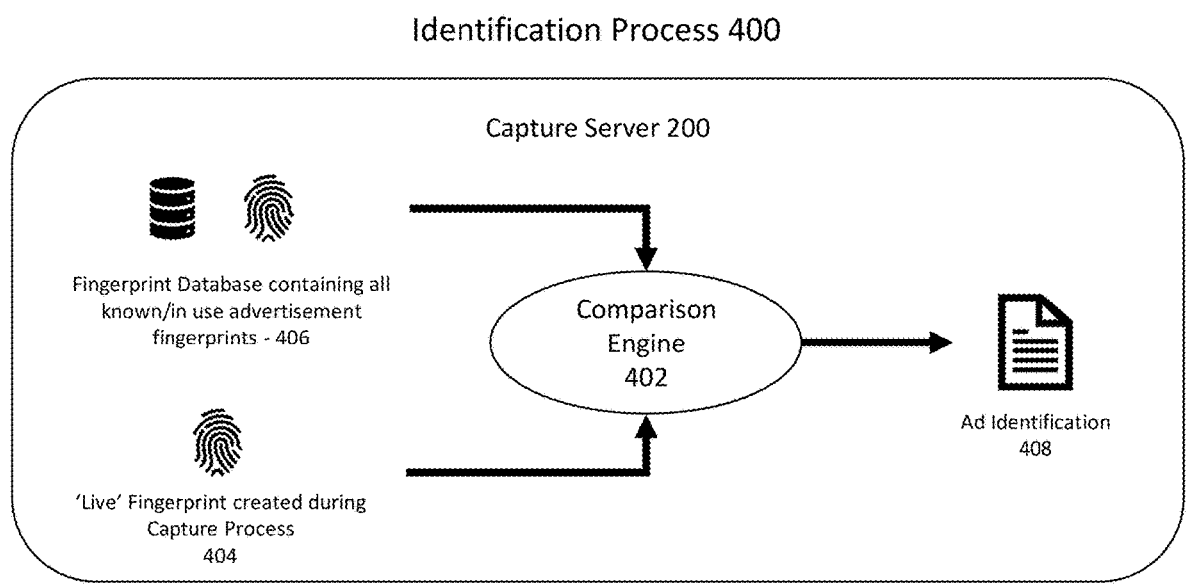
FIG. 4 is a schematic flowchart illustrating an identification process.
Figure 5:
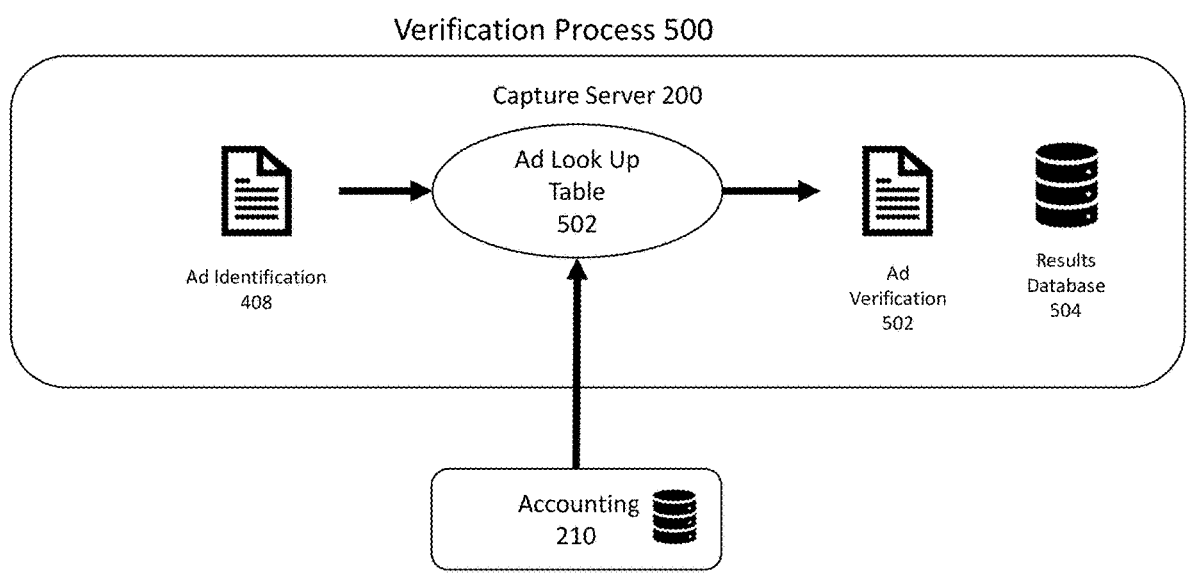
FIG. 5 is a schematic flowchart illustrating a verification process.

FIG. 4 may illustrate an exemplary identification process 400. The identification process 400 may be executed on the capture server using a built-in, cloud-based, or external comparison engine 402. The comparison engine 402 may compare the live fingerprint 404 captured during the capture process and compare it to fingerprints found in a database containing known fingerprints 406. The comparison may produce an ad identification 408 which may be a fingerprint of an advertisement. FIG. 5 may illustrate an exemplary verification process 500. After the ad identification 408, the Ad Look Up Table 502 may verify that the fingerprint matches the correct advertisement 502. The ad verification 502 may be stored in a results database 504. The ad identification 408 may identify which ad was inserted, while the ad verification 502 may additionally identify and confirm that the inserted ad was correctly selected and presented to the correct number of users and/or demographics.

Figure 6:
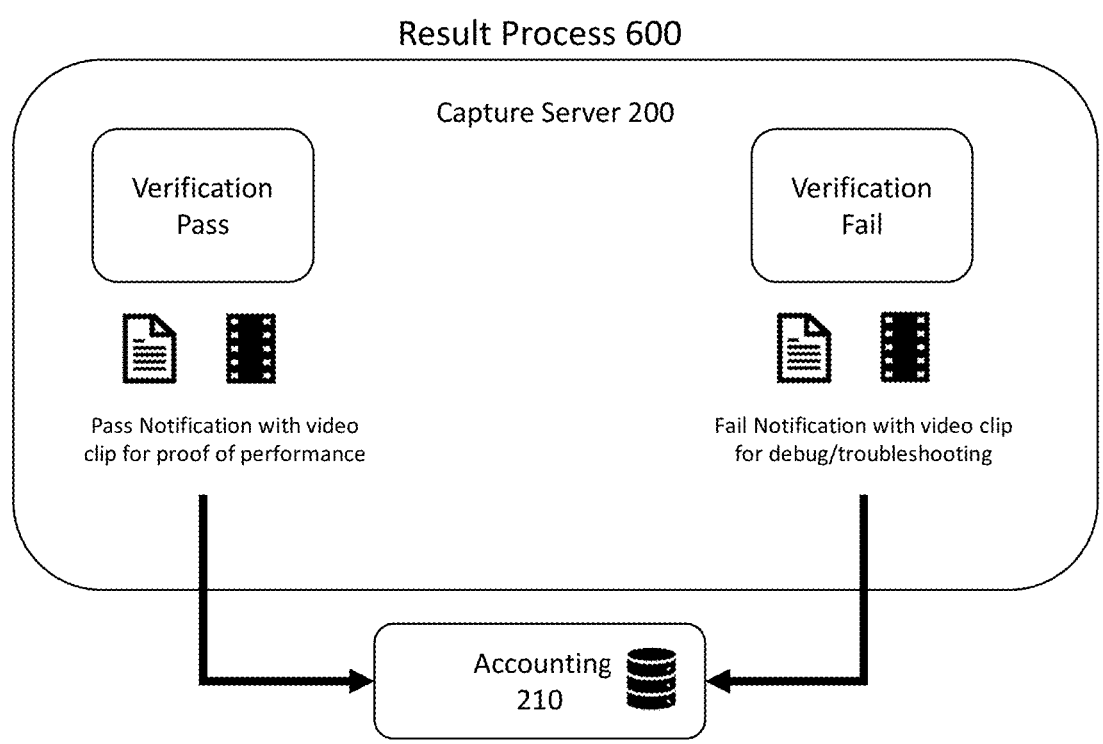
FIG. 6 is a schematic flowchart illustrating a result process.

FIG. 6 may illustrate an exemplary result process 600. During the result process 600, the content server 200 may identify whether the verification process 500 passed or failed and whether the verification 502 indicates a pass or fail with regards to each fingerprint produced. The verification pass or fail information 502 may be stored on the accounting server 210 along with a video clip for proof of performance or for debugging/troubleshooting.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for ad insertion verification comprising:
   initializing a capture server by loading one or more emulators from an array of targeting profiles comprising a plurality of loadable emulators;
   capturing data feed to the one or more emulators;
   forming a captured content fingerprint for each of the one or more emulators based on the captured data feed;
   serving one or more advertisements to the one or more emulators;
   capturing the one or more advertisements served to the one or more emulators;
   creating a captured advertisement fingerprint; and
   determining whether the advertisement fingerprint is the correct advertisement and was properly inserted.

2. The method for ad insertion verification of claim 1, wherein determining whether the advertisement fingerprint is the correct advertisement and was properly inserted comprises at least comparing the advertisement fingerprint against a database of known advertisements and known reference fingerprints.

3. The method for ad insertion verification of claim 1, wherein each of the one or more emulators represents a single target profile; and
   wherein the one or more emulators are a plurality of emulators and wherein initializing the capture server comprises loading, on the capture server, the plurality of emulators each configured to run on the capture server.

4. The method for ad insertion verification of claim 1, wherein the captured content fingerprint is formed from video data, audio data, or a combination of video and audio data.

5. The method for ad insertion verification of claim 1, wherein the captured content fingerprint is formed from audio, video contained in the advertisement, and/or metadata such as a unique identifier specific to that advertisement.

6. The method for ad insertion verification of claim 1, wherein the one or more advertisements served to each of the one or more emulators is determined by a data vendor.

7. The method for ad insertion verification of claim 2, further comprising detecting a mismatch between the advertisement fingerprint and one or more of the known reference fingerprints; and
debugging the emulator with the mismatch by re-inserting the desired advertisement.

8. The method for ad insertion verification of claim 7, wherein detecting the mismatch is performed on at least one emulator in the one or more emulators, after an advertisement having the advertisement fingerprint is played on the at least one emulator; and
wherein debugging the emulator with the mismatch by re-inserting the desired advertisement comprises replaying the desired advertisement on the emulator with the mismatch.

9. The method for ad insertion verification of claim 3, wherein each of the one or more emulators is tuned to at least a live linear media feed or a video-on-demand feed.

10. The method for ad insertion verification of claim 5, wherein the unique identifier specific to each advertisement is one or more of a number, watermark, or other coded notation.

11. A dynamic ad insertion verification engine comprising:
an array of targeting profiles, the array of targeting profiles comprising a plurality of loadable emulators that emulate one or more media feeds;
a capture server; wherein one or more emulators in the plurality of loadable emulators are loaded from the array of targeting profiles and are configured to run on the capture server, and the capture server;
captures data feed from the one or more emulators,
forms a captured content fingerprint for each of the one or more emulators based on the captured data feed
captures one or more advertisements served to the one or more emulators,
creates a captured advertisement fingerprint, and
determines whether the advertisement fingerprint is the correct advertisement and was properly inserted.

12. The dynamic ad insertion verification engine of claim 11, wherein determining whether the advertisement fingerprint is the correct advertisement and was properly inserted comprises at least comparing the advertisement fingerprint against a database of known advertisements and known reference fingerprints.

13. The dynamic ad insertion verification engine of claim 11, wherein each of the one or more emulators represents a single target profile; and
wherein a plurality of emulators are loaded from the array of targeting profiles and are configured to run on the capture server.

14. The dynamic ad insertion verification engine of claim 11, wherein the captured content fingerprint is formed from video data, audio data, or a combination of video and audio data.

15. The dynamic ad insertion verification engine of claim 11, wherein the captured content fingerprint is formed from audio, video contained in the advertisement, and/or metadata such as a unique identifier specific to that advertisement.

16. The dynamic ad insertion verification engine of claim 11, wherein the one or more advertisements served to each of the one or more emulators is determined by a data vendor.

17. The dynamic ad insertion verification engine of claim 12, wherein the capture engine further detects a mismatch between the advertisement fingerprint and one or more of the known reference fingerprints; and debugs the emulator with the mismatch by re-inserting the desired advertisement.

18. The dynamic ad insertion verification engine of claim 13, wherein each of the one or more emulators is tuned to at least a live linear media feed or a video-on-demand feed.

19. The dynamic ad insertion verification engine of claim 15, wherein the unique identifier specific to each advertisement is one or more of a number, watermark, or other coded notation.

20. A non-transitory computer-readable medium comprising program code that, when executed on a processor, is configured to cause the processor to perform steps of ad insertion verification comprising, on a processor,
initializing a capture server by loading one or more emulators from an array of targeting profiles comprising a plurality of loadable emulators;
capturing data feed at the one or more emulators;
forming a captured content fingerprint for each of the one or more emulators based on the captured data feed;
capturing one or more advertisements served to the one or more emulators;
creating a captured advertisement fingerprint; and
determining whether the advertisement fingerprint is the correct advertisement and was properly inserted.

* * * * *